United States Patent [19]

Zierden et al.

[11] 4,313,624

[45] Feb. 2, 1982

[54] SWIVEL CARTRIDGE

[75] Inventors: Frank P. Zierden, Oak Creek; Peter F. Zierden, Franklin, both of Wis.

[73] Assignee: Zierden Company, Oak Creek, Wis.

[21] Appl. No.: 156,937

[22] Filed: Jun. 6, 1980

[51] Int. Cl.³ ............................................. F16L 27/00
[52] U.S. Cl. ..................................... 285/14; 285/276; 285/331
[58] Field of Search ................. 285/14, 276, 281, 275, 285/347, 98, 278, 331

[56] References Cited

U.S. PATENT DOCUMENTS

| | | | |
|---|---|---|---|
| 2,176,323 | 10/1939 | Bowen et al. | 285/281 X |
| 2,459,981 | 1/1949 | Warren | 285/276 X |
| 2,655,391 | 10/1953 | Atkins | 285/275 |
| 2,786,698 | 3/1957 | Bard | 285/347 X |
| 2,817,543 | 12/1957 | Corsette | 285/347 X |
| 2,927,804 | 3/1960 | Snyder et al. | 285/276 X |
| 3,376,053 | 4/1968 | Novakovich et al. | 285/347 X |
| 3,420,555 | 1/1969 | Faccou | 285/276 X |
| 3,456,964 | 7/1969 | Zierden | 285/276 X |
| 3,462,174 | 8/1969 | Raley | 285/276 X |
| 3,679,235 | 7/1972 | Faccou | 285/14 |
| 3,967,842 | 7/1976 | Kendrick | 285/276 |
| 4,131,132 | 12/1978 | Zierden | 403/316 |

FOREIGN PATENT DOCUMENTS 6408396  2/1965  Netherlands ........................ 285/276

Primary Examiner—Thomas F. Callaghan
Attorney, Agent, or Firm—Quarles & Brady

[57] ABSTRACT

A swivel cartridge for attachment to the stationary outlet of a fluid supply to allow a fluid delivery hose to be moved freely about the supply outlet includes an inlet tube adapted for connection to the supply outlet, an outlet tube having a nose at one end received in a bore in the inlet tube and having a hose connection at the other end, a ring seal mounted on the nose closing a clearance between the bore of the inlet tube and the outside of the nose, and a ball bearing having an inner race connected to the inlet tube and an outer race connected to a housing which rotates with the outer race relative to the inlet tube and to which the outlet tube is removably secured. The nose is provided with a circumferential groove in which the ring seal is mounted.

6 Claims, 2 Drawing Figures

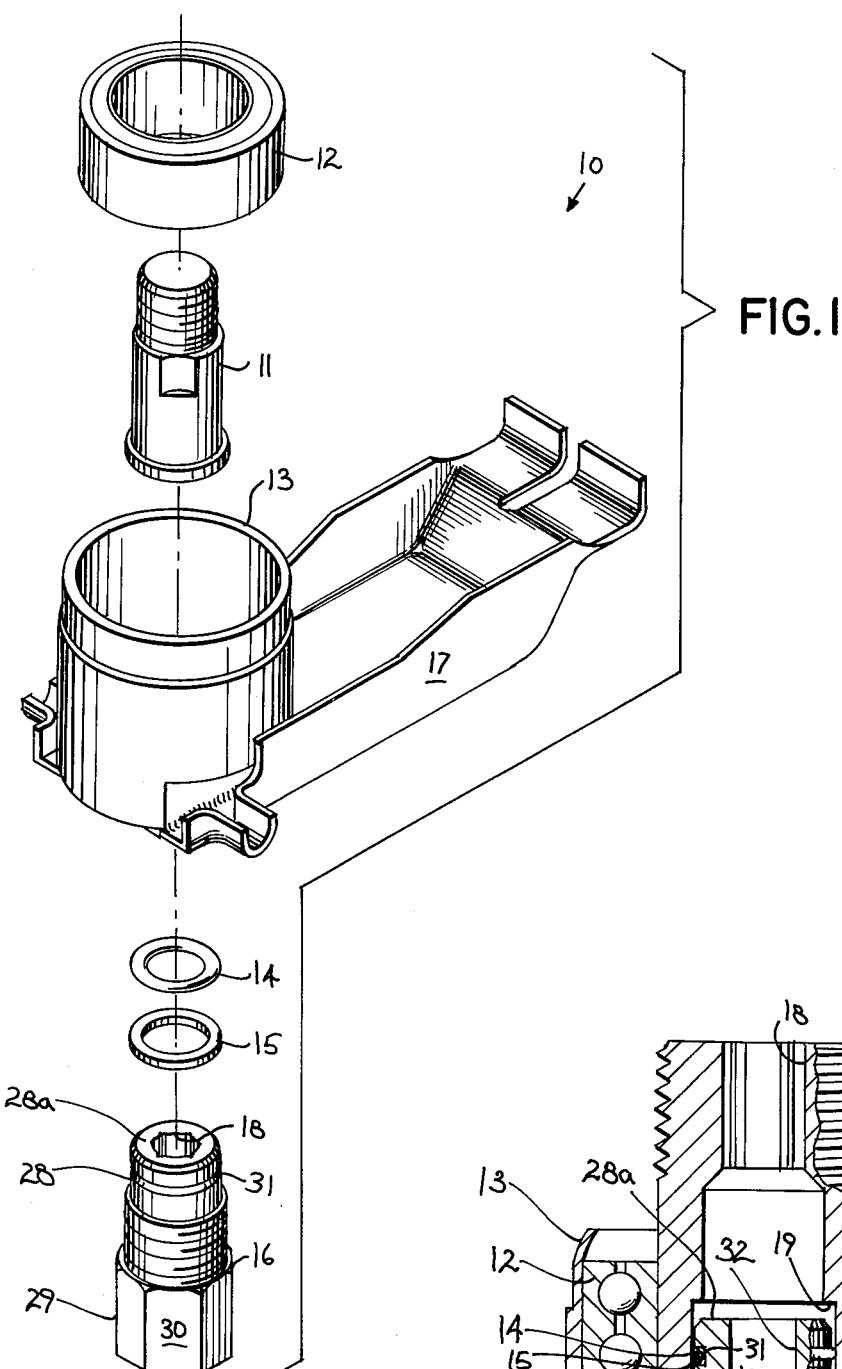
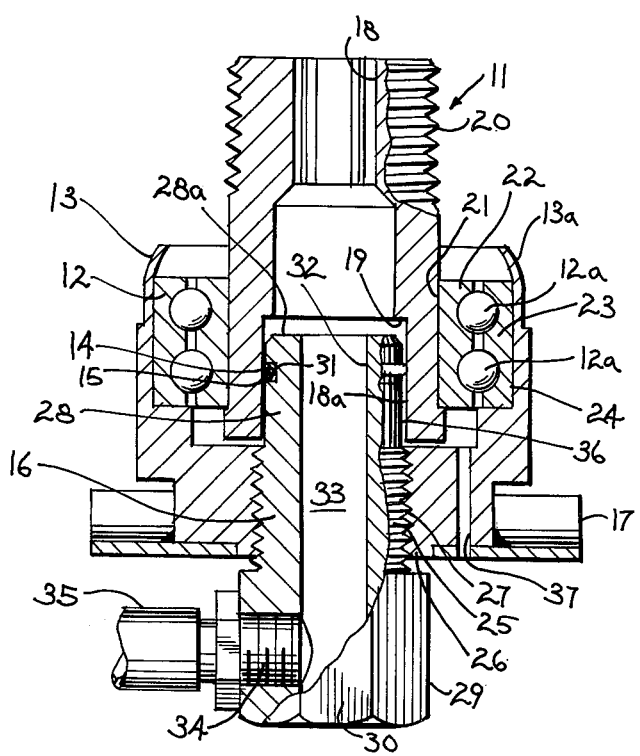
FIG. 1
FIG. 2

SWIVEL CARTRIDGE

The present invention relates to an improved swivel cartridge. More particularly, it relates to a swivel cartridge which can be attached to the stationary outlet of a fluid supply and permit a fluid delivery hose to be moved freely about the stationary outlet.

BACKGROUND OF THE INVENTION

The swivel cartridges currently in use generally include an inlet tube for connection to the outlet of a fluid supply and an outlet tube which is rotatable relative to the inlet tube and which communicates with the inlet tube at one end and a delivery hose at to the other end. Such swivel cartridges are used in various applications in which it is desired to have a delivery hose rotate about a stationary supply fluid outlet without binding. One application for a swivel cartridge is in a car washing apparatus which is described in the Zierden U.S. Pat. No. 4,131,132 which issued on Dec. 26, 1978. The patent apparatus uses a swivel cartridge to permit an overhead boom supporting a hose to be swung about so that an entire car can be washed without having to pull the hose under or over the car.

The swivel cartridges currently available for use are quite dependable. However, on occasion they do wear out and require replacement. Normally the component of the conventional swivel cartridge which is first to fail is an O-ring or similar seal, which is used to close the necessary clearance between the two relatively rotatable parts and to provide a fluid tight seal. Unfortunately, the nature of the construction of the conventional swivel cartridge requires that when the seal fails, the entire cartridge be replaced.

SUMMARY OF THE INVENTION

It is the primary object of the present invention to disclose a novel swivel cartridge in which the seal which closes the clearance and forms the fluid tight seal between the rotatable parts can be readily replaced.

It is a further object to disclose a swivel cartridge which provides a visual signal of seal failure which helps to prevent further damage to the swivel components.

The swivel cartridge of the present invention includes an inlet tube for connection to the outlet of a source of supply fluid, an outlet tube having a nose at one end received in a bore in the inlet tube and having the other end adapted for connection to a fluid delivery hose, a ring seal mounted on the nose closing the clearance between the bore of the inlet tube and the outside of the nose, a ball bearing having an inner race connected to the inlet tube and an outer race connected to a housing which rotates relative to the inlet tube and to which the outlet tube is removably secured.

In a preferred embodiment, the nose is provided with a circumferential annular groove in which an O-ring and a supporting washer are received.

When the seal of the swivel cartridge to the present invention fails, the entire swivel cartridge does not have to be replaced because the outlet tube can be readily removed from its connection with the housing, the nose withdrawn from within the base of the inlet tube, and the O-ring and the washer replaced. The outlet tube can then again be secured to the housing with the nose repositioned in the base with the new O-ring forming a fluid tight seal between the nose and the base of the inlet tube.

The foregoing and other objects and advantages will become more apparent from the drawings and the description that follows.

BRIEF DESCRIPTION OF THE DRAWING

The swivel cartridge of the present invention will be described in connection with the drawing in which:

FIG. 1 is an exploded perspective view showing the components of the unassembled swivel cartridge of the present invention, and FIG. 2 is a sectional view of the assembled swivel cartridge connected to a supply fluid outlet and a delivery hose.

DETAILED DESCRIPTION OF THE PREFERRED EMBODIMENT

As seen in FIG. 1 of the drawing, the swivel cartridge, which is generally referred to by the numeral 10, includes an inlet tube 11, a ball bearing 12, a cylindrical housing 13, a ring seal 14, a washer 15 and an outlet tube 16. The housing 13 is attached to a hinge plate 17 of a hose supporting boom of a car washing assembly of the type shown in U.S. Pat. No. 4,131,132.

Referring now to FIG. 2, it can be seen that the inlet tube 11 which has a central bore 18 with an internal ledge 19 is threaded at an entrance end 20 for engagement to the outlet of a source of fluid (not shown). The outside of the inner race 22 of the bearing 12 is secured to the outer wall 21 of the inlet tube 11 above the exit end of the inlet tube 11 and the outer race 23 of the ball bearing 12 is secured to the inside wall 24 of the housing 13. The inner race 22 and the outer race 23 need not be welded or fastened to the walls 21 and 24, respectively. The crimping of the top of the housing 13 as at 13a is usually adequate to operatively secure the races to their respective walls. Removably engaged in a central threaded opening 25 in the bottom 26 of the housing 13 is the threaded intermediate portion 27 of the outlet tube 16.

As seen best in FIG. 1, the outlet tube 16 is generally cylindrical in shape with a nose 28 of reduced diameter at one end, a threaded intermediate portion 27 and an other end 29 which is provided with a series of flats 30 to provide a good gripping surface. Adjacent to the tip 28a of the nose 28 is an axial annular groove 31 which receives the washer 15 and the ring seal 14 as seen only in FIG. 2. The ring seal 14 may be of any material suitable for the intended purpose e.g. rubber or even a self-lubricating plastic such as nylon.

In FIG. 2, the cartridge 10 is seen fully assembled with the nose 28 of the outlet tube 16 extending into the central bore 18 of the inlet tube 11. Fluid entering the assembled cartridge 10 from the outlet of a fluid source flows through the internal bore 18 into one end 32 of a passage 33 in the outlet tube 16 and out the other end 34 to a delivery hose 35. Clearance 36 is formed between the outside wall of the nose 28 and a highly polished inner wall 18a of the bore 18 and extends inbetween the housing bottom 26 and the exit end of the inlet tube 11. The fluid is prevented from flowing through the clearance 36 by a fluid-tight seal formed between the wall 18a and the outside wall of nose 28 by the washer 15 and the ring seal 14.

The delivery hose 35 can be moved freely 360 degrees clockwise or counterclockwise about the axis of the inlet tube 11 because it is attached to the outlet tube 16 which moves with the housing 13 which is secured to the outer race 23 of the ball bearing 12. The inner race 21 and the inlet tube 11 are fixed and remain stationary by virtue of their attachment to the outlet of the fluid source. The free movement of the hose 35, the outlet tube 16 and the outer race 23 relative to the inner race 21 is facilitated by the rotation or rolling of the balls 12a of the ball bearing 12 within a cage formed by the inner walls of inner race 21 and the outer race 23.

In the preferred embodiment seen in the drawings, the main portion of the ball bearing 12 is positioned above the fluid seal formed between the ring seal 14 on the nose 28 and the wall 18a of the central bore 18. As a result, when the fluid-tight seal formed by the coaction of the seal 14 and the bore 18 fails fluid entering the clearance 36 between the nose 28 and the wall 18a will normally leave the housing 13 via vent passage 37 before it can enter the ball bearing 12 and cause it to malfunction. In prior art cartridges in which the bearing is located below the seal if a leak develops the water containing detergent may by gravity enter the ball bearing and dissolve the grease. If that happens the balls and the races may then rust, pit and deteriorate causing the swivel cartridge to fail. In the preferred embodiment, the fluid leaving through the vent passage 37 provides a visual signal that the seal has failed and that the washer 15 and seal 14 should be replaced.

The replacement of the fluid-tight seal of the swivel cartridge of the present invention is easily accomplished. The hose 35 is unthreaded from the end 34 of the outlet tube 16 and the outlet tube 16 unthreaded from its connection in the opening 25 in bottom 26 of the housing 13. The old O-ring 14 and washer 15 are removed and discarded and a new O-ring 14 and washer 15 positioned in the groove 31. The outlet tube 16 is then rethreaded into the opening 25 until the O-ring 14 engages the highly polished inner wall 18a of the bore 18. The hose 35 is then reconnected to the threaded end 34 of the passage 33 of the outlet tube 16 and the swivel cartridge 10 is once again for use.

It will be appreciated by those skilled in the art that the swivel cartridge of the present invention provides significant advantages over previously available swivel cartridges. For example, when the swivel cartridge of the present invention is used in the car washing apparatus shown in the Zierden patent supra the boom does not have to be disconnected from the mounting bracket when the fluid-tight seal fails. Instead, the delivery hose only has to be disconnected from the outlet tube, the outlet tube removed from the housing and the seals and washer replaced. The simple replacement of the seal greatly reduces the expensive downtime which can result when the entire cartridge has to be replaced.

It will also be apparent to those skilled in the art that a number of modifications and changes can be made without departing from the spirit and scope of the invention. For example, in some applications it may be desirable to replace the O-ring and washer combination with an O-ring alone or another type of ring seal. It might also be desirable in some instances to use more than one washer and/or ring seals. Therefore, it is intended that the scope of the invention not be limited to the embodiments shown and described, but only by the claims which follow:

We claim:

1. A swivel cartridge for rotatably coupling a hose to an overhead source of vehicle-washing fluid, the cartridge comprising:

an inlet tube with an entrance end adapted for connection to the fluid source and with a bore therethrough from the entrance end to an exit end;

a bearing secured to the outside of the inlet tube above its exit end and having an outer race that rotates around the inlet tube;

a housing secured to the outer race of the bearing to rotate around the inlet tube, the housing having a bottom positioned below the exit end of the inlet tube and the housing bottom having an opening aligned with the bore of the inlet tube;

an outlet tube removably mounted in the opening in the housing bottom with a nose that extends upwardly therefrom into the bore of the inlet tube for rotation therein, and with a hose coupling portion that depends from the housing bottom, the outlet tube having a passage therethrough from the bore of the inlet tube to its hose coupling portion, and the nose being smaller in diameter than the bore of the inlet tube to form a clearance; and a ring seal mounted around the nose of the outlet tube and positioned within the bore of the inlet tube to prevent leakage of vehicle-washing fluid through the clearance, the ring seal being smaller than the opening in the housing bottom, so that it can be removed from the cartridge with the outlet tube without moving the bearing.

2. The swivel cartridge of claim 1 in which the nose has a circumferential groove on its outside in which the ring seal is mounted.

3. The swivel cartridge of claim 2 in which the ring seal includes an O-ring and a supporting washer.

4. The swivel cartridge of claim 1 in which the opening in the housing is threaded and the outlet tube has a mating threaded connection which is engaged in the opening to secure the outlet tube.

5. A swivel cartridge for rotatably coupling a hose to an overhead source of soapy water, the cartridge comprising:

an inlet tube with an entrance end adapted for connection to the overhead source and with a bore therethrough from the entrance end to an exit end;

a bearing secured to the outside of the inlet tube above its exit end and having an outer race that rotates around the inlet tube;

a housing secured to the outer race of the bearing to rotate around the inlet tube, the housing having a bottom which is spaced from the exit end of the inlet tube to define a portion of a clearance, the housing bottom having an opening aligned with the bore of the inlet tube and the housing bottom forming a vent which is laterally spaced from the opening and which leads from the clearance to the outside of the cartridge;

an outlet tube removably mounted in the opening in the housing bottom, with a nose that extends upwardly therefrom into the bore of the inlet tube for rotation therein, and with a hose coupling portion that depends from the housing bottom, the outlet tube having a passage therethrough from the bore of the inlet tube to its hose coupling portion, and the nose being smaller in diameter than the bore of the inlet tube to form another portion of the clearance; and a ring seal mounted around the nose of the outlet tube and positioned within the bore of the inlet tube to prevent leakage through the clearance of the soapy water flowing down to it from the overhead source,
whereby the failure of the enclosed seal is signalled by the escape of soapy water through the vent.

6. The cartridge of claim 5, wherein a portion of the bearing is positioned above the height of the ring seal to assure that any leakage will be drawn away from the bearing.

* * * * *